United States Patent Office 3,451,999
Patented June 24, 1969

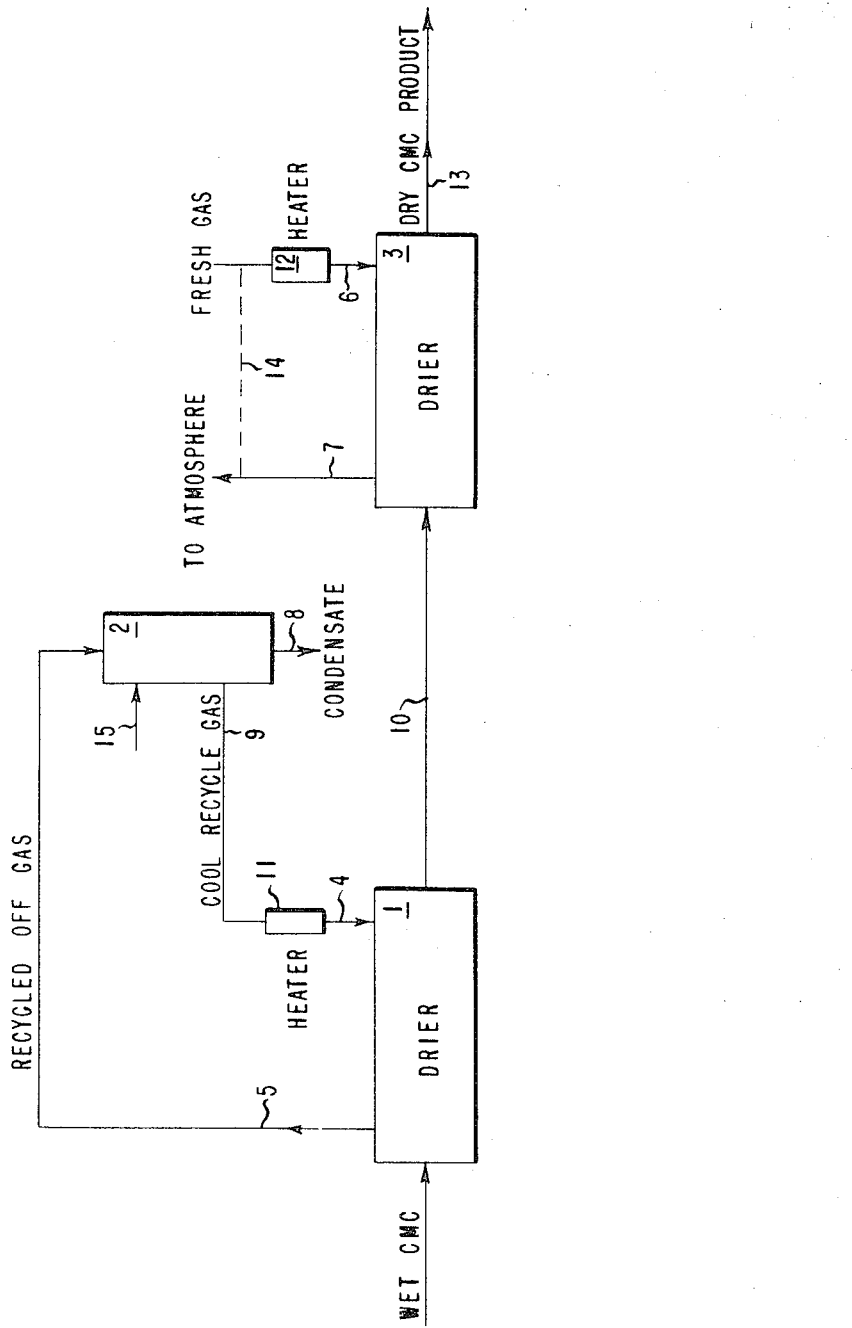

3,451,999
REMOVING AROMATIC HYDROCARBONS FROM CARBOXYMETHYL CELLULOSE
Richard L. Evans, Woodbury, N.J., assignor to E. I. du Pont de Nemours and Company, Wilmington, Del., a corporation of Delaware
Filed Nov. 10, 1965, Ser. No. 507,142
Int. Cl. C08b 11/20
U.S. Cl. 260—232        7 Claims

ABSTRACT OF THE DISCLOSURE

Aromatic hydrocarbons removed from carboxymethyl cellulose by heating said cellulose with recycled hot gas containing aromatic hydrocarbon impurities volatilized from the cellulose ether until the total volatile content of the cellulose is from about 15 to 35% and then contacting the treated carboxymethyl cellulose with aromatic hydrocarbon-free hot gas for further drying.

---

The present invention relates to a process for treating alkali metals salts of carboxymethylcellulose and, more particularly, to a process for removing impurities from alkali metal salts of carboxymethylcellulose.

During the recovery or manufacture of alkali metal salts of carboxymethylcellulose the product comes in contact with aromatic hydrocarbons. In view of the fact that these cellulose ethers, particularly sodium carboxymethylcellulose, hereinafter referred to as CMC, are widely used in industry as a food additive, it is imperative they do not contain aromatic hydrocarbon impurities. However, CMC is made by the reaction of alkali cellulose and chloroacetic acid, thus resulting in the production of considerable quantities of sodium chloride as a by-product. Sodium chloride must be separated from the CMC in order to obtain a purified ether. Water can not be used to remove sodium chloride because both CMC and sodium chloride are water soluble. Therefore, it has been customary to use a 60–70% concentration of ethanol for this washing step. However, because of Government regulations denatured alcohol must be used and the grade most commonly used contains about 0.5 percent benzene as a denaturant. When CMC is washed with benzene-containing alcohol and then dried in a recirculating air drier, the resulting dry CMC contains unacceptable quantities of benzene. Then too, aromatic hydrocarbons such as benzene, toluene, xylene etc., can also be introduced into CMC by slurry processes of manufacture as illustrated, for example, in U.S. Patent 2,976,278 wherein aromatic hydrocarbons are part of the slurry system. This too, of course, presents a problem of contamination requiring removal of the aromatic hydrocarbons when CMC is to be used as a food additive. Here too, when CMC is dried in a recirculating gas drier it still contains unacceptable quantities of aromatic hydrocarbon, e.g., benzene. Up to the time of the present invention the aromatic hydrocarbon content in CMC could be removed only by heating CMC in a gas drier in which the inlet gas is always virgin hot gas or recycled hot gas from which aromatic hydrocarbons, e.g., benzene, have been scrubbed. However, such procedures complicate solvent recovery and reuse and they are costly.

Quite surprisingly it has now been discovered that aromatic hydrocarbons can be removed from wet CMC and a dried, purified product obtained by a two-step process which comprises:

(1) Heating an alkali metal salt of carboxymethylcellulose with recycled hot gas which will contain aromatic hydrocarbon impurities volatilized from said cellulose ether, until the total volatile content of the carboxymethylcellulose is from about 15 to 35 percent, preferably 20 to 25 percent, and (2) Subsequently contacting the treated carboxymethylcellulose with a substantially aromatic hydrocarbon-free hot gas for further drying.

The resulting dried CMC is free from aromatic hydrocarbons and can be used in food products. Yet, on the other hand, if the partially dried CMC of the first step is further dried with the same hot gas initially used in the first drying step, the resultant CMC contains unacceptable amounts of aromatic hydrocarbons. Accordingly, it has been found that when alkali metal salts of CMC are heated with recycled hot gas until the total volatile content of CMC is reduced to from about 15 to 35 percent, preferably 20 to 25 percent, the CMC at this point is substantially free of aromatic hydrocarbons. The volatile components remaining in the CMC, most of which is water, are substantially removed in the second drying step using substantially aromatic hydrocarbon-free hot gas.

Carboxymethylcellulose prepared by conventional methods and subsequently treated by the process of the present invention is wet and contains from about 18 to 35 percent water and from about 45 to 65 percent total volatiles. As noted above, the carboxymethylcellulose may be produced by, for example, the process described in U.S. Patent 2,976,278. In addition, when such CMC is treated to remove sodium chloride with an aqueous alcohol containing a denaturant, e.g., aqueous ethanol containing benzene, quantities of aromatic hydrocarbons of the order of not more than about 3000 parts per million per part of cellulose ether, and generally ranges of from about 1000 to 2000 parts per million per part of cellulose ether, are taken up by said ether which is subsequently purified by the process of this invention.

Reference is now made to the flow sheet which illustrates a preferred embodiment of the invention. Wet solids of an alkali metal salt of CMC enter drier 1 and are heated with hot gas entering at gas inlet 4 which was initially supplied from a source through inlet 15, and heated by heater 11. The gas flow, countercurrent to the flow of cellulose ether, dries the cellulose ether and is removed at gas outlet 5 for recirculation. The gas passes through condenser 2 where vapor is partially condensed and discharged at 8 and the cooled noncondensables are circulated through conduit 9 and returned to drier 1 through heater 11. The partially-dried cellulose ether, now having a total volatile content of from about 15 to 35 percent, substantially all of which is water, is conveyed to drier 3 by conveyor 10. Fresh gas, e.g., virgin hot air, not contaminated with aromatic hydrocarbons, is heated by means of heater 12 and fed into dryer 3 at gas inlet 6 where it contacts the partially-dried product to complete drying, which substantially involves removing water. The hot gas is vented to the atmosphere at gas outlet 7 or said gas may be recirculated through conduit 14 for reuse in the system provided, of course, it is substantially free of aromatic hydrocarbons. The resultant cellulose ether is dried to any desired level, usually having about 2 to 10 percent water, and preferably less than 5%, and is discharged through exit port 13. Alternatively, the process can be conducted in other suitable apparatus. For example, a single drier may be used that is provided with a system of valves and conduits for regulating the gas flow to and from the drier.

The composition of the wet CMC solids after washing with ethanol to remove sodium chloride and sodium glycollate is from about 18 to 35% water and from about 45 to 65% total volatiles. The aromatic hydrocarbon content in the CMC normally ranges from about 1000 to 2000 parts per million and may contain up to 3000 parts per million parts of cellulose ether. Preferably at least about 40% of the volatile material should be water. If the ethanol content of the volatile materials is too high the aromatic hydrocarbons in the wet CMC will not be as efficiently removed. Water increases the relative volatility of the aromatic hydrocrabons and assists in the rapid removal of the latter. Water can be added either in the first drier or in the second drier to adjust the volatile composition. Water can also be added in the second drier to effect densification.

The temperature of drying is not critical and is limited on the lower side only by the drying time needed for economy and on the higher side by the decomposition of the cellulosic derivative. Generally this drying temperature is about from 60° to 130° C. and preferably about from 80° to 100° C.

The type of drier that can be used in the present invention is not critical from the standpoint of operability of the invention. Obviously, however, economic factors will influence the type of drier used. For wet solids typified by wet CMC the preferred driers are direct hot air units such as rotary or conveyor driers. The gas flow can be countercurrent or cocurrent to the path travelled by the wet CMC, but is preferably countercurrent. A discussion of factors influencing the selection of driers is found in "Chemical Process Machinery," 2nd ed., Riegel Reinhold, 1953.

The hot gas employed to dry the cellulose ether may be any inert gas such as air, nitrogen, argon, $CO_2$, and mixtures thereof. For safety of operation the concentration of oxygen in the inert gas supplied to the first drying stage is from about 0–12%. However, the hot gas supplied to the second drying stage can be air or any other inert gas because essentially no flammable solvents are present in the second drying stage.

Condensers used for stripping evaporated liquids from the hot off-gas are conventional.

EXAMPLE A

This example illustrates a procedure wherein hot air is recycled through CMC until it is dried. It can be seen from the following tabulating time against volatile substituents that as the wet CMC is dried using recycled gases its benzene content at first decreases to substantially zero and then, after the moisture content gets below about 24%, rises again. The following table also shows the benzene content of CMC as a function of drying time and percent moisture. The recycled gas contains 1.0 mol percent of benzene, the dried CMC contains 10 p.p.m. of benzene, and the drying temperature is 93° C.

| Drying time (minutes) | Total volatiles, percent | Water, percent | Ethanol, percent | Benzene, p.p.m. |
|---|---|---|---|---|
| 0 | 63.3 | 39.6 | 23.7 | 500 |
| 10 | 50.1 | 40.6 | 9.5 | 20 |
| 35 | 44.6 | 42.0 | 2.6 | 2.5 |
| 60 | 37.9 | 36.7 | 1.2 | <0.2 |
| 75 | 24.0 | 24.0 | | <0.2 |
| 100 | 5.6 | | | 6 |
| 120 | 2.5 | | | 10 |

In another experiment with 0.2 mole percent benzene in the recycled air and 61.6% total volatiles in the starting CMC, after 120 minutes drying time the moisture content is 4.0% and the benzene content is 2.2 p.p.m.

In another experiment with 0.04 mol percent benzene in the recycled air and with 61.5% total volatiles in the wet CMC, after 120 minutes the moisture content is 3.1% and the benzene content is 0.5 p.p.m.

The following examples illustrate a preferred process of the invention.

EXAMPLE 1

CMC (D.E. 0.78) made in a benzene-ethanol slurry according to the process of U.S. Patent 2,976,278, which has been washed with denatured ethanol (SDA–2B formula) and which has a total volatiles content after filtering of 65%, of which 26.4% is water, 39.5% is alcohol, and contains 1000 p.p.m. of benzene based on the total wet sample, is conveyed into a drier as shown in the drawing and heated to about 66° C. with hot air. The benzene content of the recycled gas is 0.9 mol percent, after equilibrium is reached. The drying curve data is shown below:

| Drying time (minutes) | Total volatiles, percent | Water, percent | Ethanol, percent | Benzene, p.p.m. |
|---|---|---|---|---|
| 4 | 60.6 | 28.3 | 32.3 | 370 |
| 12 | 52.4 | 32.2 | 20.2 | 4 |
| 20 | 37.2 | 31.1 | 6.1 | 2.5 |
| 24 | 33.2 | 29.3 | 3.9 | 0.3 |

After this period of time the partially dried CMC is removed from the first drier, 0.17 part of water per part of net CMC is added for densification purposes, and the CMC is conveyed to a second drier, where it is heated to 88° C. with aromatic hydrocarbon-free air. The drying curve data is shown below.

| Drying time (minutes) | Total volatiles, percent | Water, percent | Ethanol, percent | Benzene, p.p.m. |
|---|---|---|---|---|
| 0 | 40.5 | 37.2 | 3.3 | 0.3 |
| 16 | 32.6 | | | <0.2 |
| 48 | 19.1 | | | <0.2 |
| 96 | 2.2 | | | <0.2 |

The dry CMC is removed from the second drier and packed for shipment.

EXAMPLE 2

The procedure and the CMC to be purified is the same as that described in Example 1, except that the first drier is heated to 77° C. and the second to 93° C. After 24 minutes in the first drier the total volatiles content of the CMC is 28.6 of which 28.0% is water. The benzene content of this sample is <0.2%. After 96 minutes in the second drier where the CMC was further dried with fresh air free from aromatic hydrocarbons, the total volatiles are down to 2.4% and the benzene content remains at an undetectable level.

The method for analysis of small quantities of benzene in CMC is as follows:

A benzene stock solution is prepared by dissolving 0.05 ml. of benzene in enough water to make a total of 500 ml. One ml. of this solution is made up to 50 ml. with water. One, three, and five ml. of the resulting solution are added separately to three 50 ml. portions of water.

A gas chromatograph is fitted with a ¼" x 6' column packed with 20% didecyl phthalate on Chromasorb W (calcined diatomaceous earth). The column is checked by injecting 1 ml. of the gas phase above liquid benzene into the chromatograph and noting the position of the benzene peak. Then, 1 ml. of room air is injected into the chromatograph. No peak at the benzene position should appear.

A calibration curve is set up by heating the standard solutions diluted as described above to 50° C., and injecting two ml. of the gas phase above each of the solutions into the chromatograph. The height of these benzene peaks represent 1.8, 3.5 and 5.3 p.p.m. of benzene, respectively.

Then 1 g. of CMC is dissolved in 50 ml. of water and heated to 50° C. Two ml. of the gas phase over this solution is injected into the chromatograph. From the height of this peak the quantity of benzene in the sample can be read from the calibration curve.

The lower limit of detection of benzene is 0.2 p.p.m.

I claim:

1. A two-step process for purifying alkali metal salts of carboxymethylcellulose containing an aromatic hydrocarbon which comprises (1) heating said carboxymethylcellulose with recycled hot inert gas containing aromatic hydrocarbon impurities volatilized from said cellulose ether until the total volatile content of the carboxymethylcellulose is from about 15 to 35 percent and, (2) subsequently contacting the treated carboxymethylcellulose with substantially aromatic hydrocarbon-free hot inert gas for further drying.

2. A two-step process for purifying alkali metal salts of carboxymethylcellulose containing an aromatic hydrocarbon which comprises (1) heating said carboxymethylcellulose containing from about 18 to 35 percent water and from about 45 to 65 percent total volatiles and containing not more than about 3000 parts per million of an aromatic hydrocarbon with recycled hot inert gas containing aromatic hydrocarbon impurities volatilized from said cellulose ether until the total volatile content of said carboxymethylcellulose is reduced to from about 15 to 35 percent and is substantially water and, (2) subsequently contacting the treated carboxymethylcellulose with substantially aromatic hydrocarbon-free hot inert gas for further drying and recovering purified carboxymethyl cellulose.

3. The process of claim 2 wherein the volatile content of said carboxymethylcellulose is reduced to about 20 to 25 percent in the first step employing recycled gas.

4. The process of claim 2 wherein the alkali metal salt of the cellulose derivative is sodium carboxymethylcellulose and the hot gas of the first step contains less than 12% oxygen.

5. The process of claim 4 wherein the aromatic hydrocarbon impurity is benzene.

6. The process of claim 3 wherein the carboxymethylcellulose is sodium carboxymethylcellulose.

7. A process for purifying sodium carboxymethylcellulose containing benzene which comprises (1) contacting said carboxymethylcellulose with recycled hot inert gas containing less than 12% oxygen and containing benzene volatilized from said cellulose ether until the total volatile content of the carboxymethylcellulose is from about 20 to 25 percent and, (2) subsequently contacting the treated carboxymethylcellulose with virgin hot air for further drying and recovering purified carboxymethylcellulose.

References Cited
UNITED STATES PATENTS

| | | | |
|---|---|---|---|
| 3,289,312 | 12/1966 | Wenzke et al. | 34—10 |
| 3,041,736 | 7/1962 | Peterson et al. | 34—12 |

HOSEA E. TAYLOR, JR., *Primary Examiner.*

R. W. MULCAHY, *Assistant Examiner.*